US012560293B2

(12) United States Patent
Onoma

(10) Patent No.: US 12,560,293 B2
(45) Date of Patent: Feb. 24, 2026

(54) VEHICLE LIGHT-GUIDING BODY AND VEHICLE LIGHTING UNIT

(71) Applicant: Ichikoh Industries, Ltd., Isehara (JP)

(72) Inventor: Kei Onoma, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/690,636

(22) PCT Filed: Sep. 5, 2022

(86) PCT No.: PCT/JP2022/033292

§ 371 (c)(1),
(2) Date: Mar. 8, 2024

(87) PCT Pub. No.: WO2023/038010

PCT Pub. Date: Mar. 16, 2023

(65) Prior Publication Data

US 2025/0230911 A1 Jul. 17, 2025

(30) Foreign Application Priority Data

Sep. 8, 2021 (JP) ................................ 2021-146203

(51) Int. Cl.
*F21S 41/24* (2018.01)
*F21S 41/32* (2018.01)
*F21W 102/155* (2018.01)

(52) U.S. Cl.
CPC ............. *F21S 41/24* (2018.01); *F21S 41/322* (2018.01); *F21W 2102/155* (2018.01)

(58) Field of Classification Search
CPC .......... F21S 41/24; F21S 41/322; F21S 41/27; F21S 41/25; F21S 41/26; F21S 43/235;
(Continued)

(56) References Cited

U.S. PATENT DOCUMENTS

2018/0058651 A1* 3/2018 Gromfeld ............... F21S 41/25
2018/0087745 A1 3/2018 Gromfeld

FOREIGN PATENT DOCUMENTS

JP 2017-84556 A 5/2017
JP 6130602 B2 5/2017
(Continued)

OTHER PUBLICATIONS

Search English translation of JP-2020091998-A (Year: 2020).*
(Continued)

*Primary Examiner* — Omar Rojas Cadima
(74) *Attorney, Agent, or Firm* — Oblon, McClelland, Maier & Neustadt, L.L.P.

(57) ABSTRACT

The invention is to irradiate a light distribution pattern with an appropriate illuminance. A vehicle light-guiding body includes an incidence surface, a first reflection surface internally reflecting incident light, a second reflection surface internally reflecting the light reflected by the first reflection surface forward, a light blocking part blocking a portion of the light reflected by the second reflection surface, an adjustment surface extending forward from a front side end of the second reflection surface, a transmission surface provided in a state of extending upward in an up-down direction from the front side end of the adjustment surface and transmitting a portion of light reflected by the second reflection surface to a light-guiding body outer part, a connection surface connecting the transmission surface and the light blocking part, and internally reflecting a portion of the light internally reflected by the second reflection surface, a re-incidence surface, and an emission surface.

7 Claims, 9 Drawing Sheets

(58) Field of Classification Search
CPC ............ F21S 43/237; F21W 2102/155; F21W 2102/13; F21W 2102/18; G02B 6/00; G02B 6/0001; G02B 19/0028; B60Q 1/04
See application file for complete search history.

(56) References Cited

FOREIGN PATENT DOCUMENTS

| | | | | |
|---|---|---|---|---|
| JP | 2019-3956 | A | | 1/2019 |
| JP | 2020091998 | A | * | 6/2020 |
| JP | 2021-86724 | A | | 6/2021 |
| WO | WO 2021/085298 | A1 | | 5/2021 |

OTHER PUBLICATIONS

Office Action issued Oct. 1, 2024, in corresponding Japanese Patent Application No. 2021-146203 (with English Translation), 7 pages.
International Search Report mailed on Nov. 8, 2022 in PCT/JP2022/033292 filed on Sep. 5, 2022 (2 pages).
Extended European Search Report dated Jun. 30, 2025, in corresponding European Patent Application No. 22867332.3, 10 pages.

* cited by examiner

VEHICLE LIGHT-GUIDING BODY AND VEHICLE LIGHTING UNIT

TECHNICAL FIELD

The present invention relates to a vehicle light-guiding body and a vehicle lighting unit.

BACKGROUND ART

There is known a configuration in which respective functions corresponding to a reflector, a shade, a projection lens, and the like are integrated into one vehicle light-guiding body (see, for example, PTL 1). That is, such a vehicle light-guiding body includes an incidence surface on which light from a light source is incident, an internal reflection surface (corresponding to a reflector) that internally reflects the incident light, a light blocking part (corresponding to a shade) that blocks a portion of the internally reflected light, and an emission surface (corresponding to a projection lens) that emits the light internally reflected to pass the light blocking part, and emits a light distribution pattern toward a front of a vehicle.

CITATION LIST

Patent Literature

PTL 1: Japanese Patent No. 6130602

SUMMARY OF THE INVENTION

Problems to be Solved by the Invention

The vehicle light-guiding body as described above is required to irradiate a light distribution pattern toward the front of the vehicle with an appropriate illuminance.

The present invention has been made in view of the above, and an object of the present invention is to provide a vehicle light-guiding body and a vehicle lighting unit capable of irradiating a light distribution pattern toward a front of a vehicle with an appropriate illuminance.

Means for Solving the Problem

The vehicle light-guiding body according to the present invention includes an incidence surface on which light from a light source is incident; a first reflection surface that internally reflects the light incident from the incidence surface and converts the light into substantially parallel light; a second reflection surface that internally reflects the light reflected by the first reflection surface forward; a light blocking part that blocks a portion of the light reflected by the second reflection surface; an adjustment surface that extends forward from a front side end of the second reflection surface; a transmission surface that is provided in a state of extending upward in an up-down direction from a front side end of the adjustment surface and transmits a portion of light reflected by the second reflection surface to a light-guiding body outer part; a connection surface that connects an upper side end of the transmission surface and the light blocking part, and internally reflects a portion of the light internally reflected by the second reflection surface forward; a re-incidence surface that is disposed forward with respect to the transmission surface and downward with respect to the light blocking part, and on which the light transmitted from the transmission surface to the guiding body outer part is re-incident; and an emission surface that emits the light internally reflected by the second reflection surface and passing the light blocking part or passing above the light blocking part, and the light incident from the re-incidence surface.

The vehicle light-guiding body further includes a first glare suppression surface that is disposed on the transmission surface and internally reflects upward a portion of light reflected by the second reflection surface.

In the vehicle light-guiding body, the transmission surface is divided by the first glare suppression surface and disposed at a plurality of locations.

The vehicle light-guiding body further includes a second glare suppression surface that is disposed on the re-incidence surface and reflects downward a portion of the light transmitted from the transmission surface to the light-guiding body outer part.

In the vehicle light-guiding body, the re-incidence surface is divided by a step portion and disposed at a plurality of locations.

In the vehicle light-guiding body, the emission surface emits a light distribution pattern toward the front of the vehicle.

In the vehicle light-guiding body, the light distribution pattern includes a main pattern in which a first pattern and a second pattern overlap each other at the front of the vehicle, the first pattern is formed by the light that is internally reflected by the second reflection surface, passes above the connection surface, passes the light blocking part or passes above the light blocking part, and is emitted from the emission surface, and the second pattern is formed by the light that is internally reflected by the second reflection surface, internally reflected by the connection surface, passes the light blocking part or passes above the light blocking part, and is emitted from the emission surface.

In the vehicle light-guiding body, the first pattern and the second pattern have cut-off lines overlapping each other at upper ends thereof, and a lower end of the second pattern is closer to the cut-off lines than a lower end of the first pattern is.

A vehicle lighting unit according to the present invention includes a light source; and a plurality of vehicle light-guiding bodies described above that guide and emit light from the light source.

Effect of the Invention

According to the present invention, it is possible to irradiate a light distribution pattern toward a front of a vehicle with an appropriate illuminance.

MODE FOR CARRYING OUT THE INVENTION

Hereinafter, embodiments of a vehicle light-guiding body and a vehicle lighting unit according to the present invention will be described with reference to the drawings. The present invention is not limited by this embodiment. Components in the following embodiment include those that can be easily replaced by those skilled in the art, or those that are substantially the same. In the following description, each of the front-rear, up-down, and right-left directions is a direction in a vehicle-mounted state where a vehicle headlamp is mounted in a vehicle, and indicates a direction when a traveling direction of the vehicle is viewed from the driver's seat. In this embodiment, the up-down direction is parallel to the vertical direction and the left-right direction is the horizontal direction.

Figure 1:
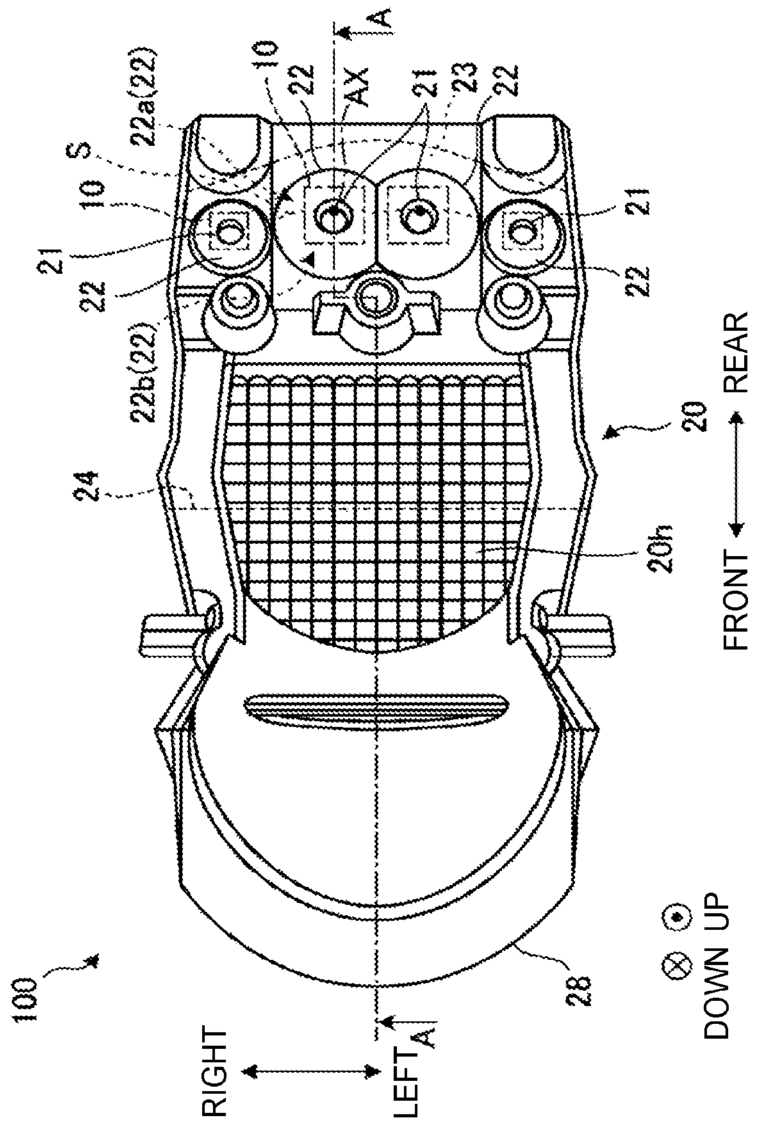
FIG. 1 is a plan view showing an example of a vehicle lamp according to the present embodiment.
Figure 2:
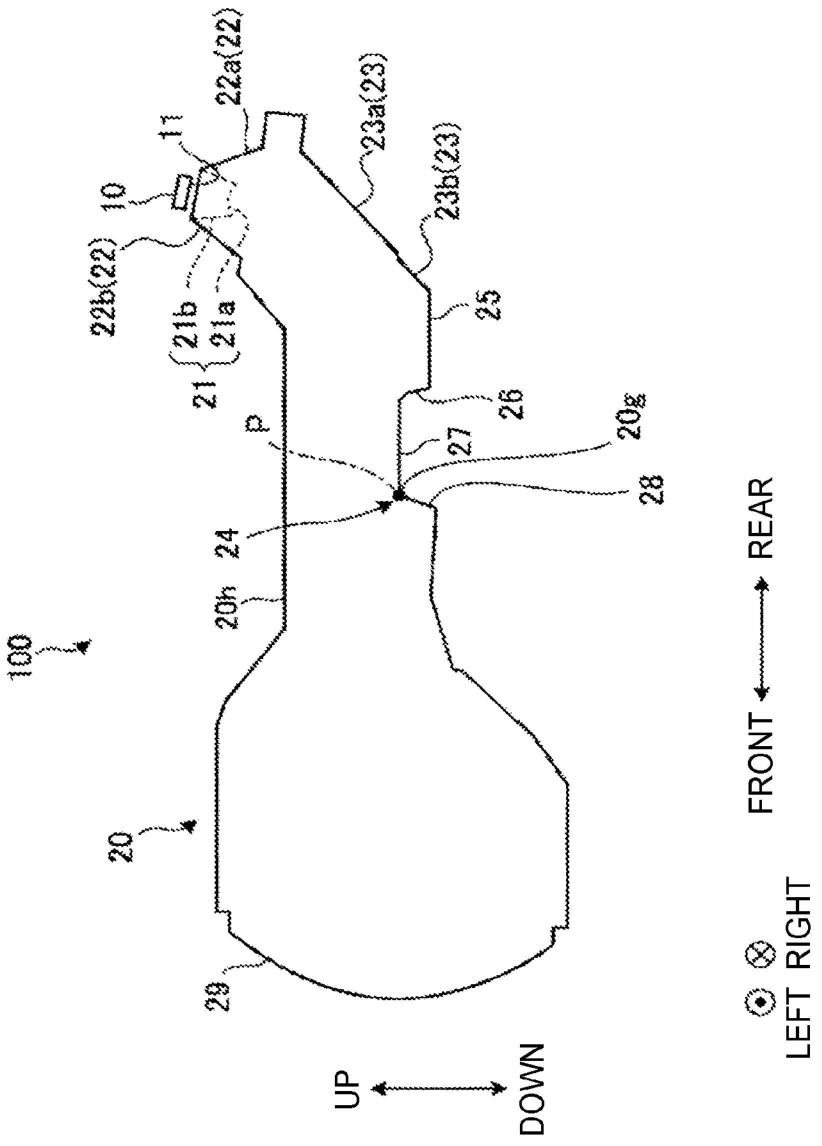
FIG. 2 is a view showing a configuration along an A-A cross section in FIG. 1.
Figure 3:
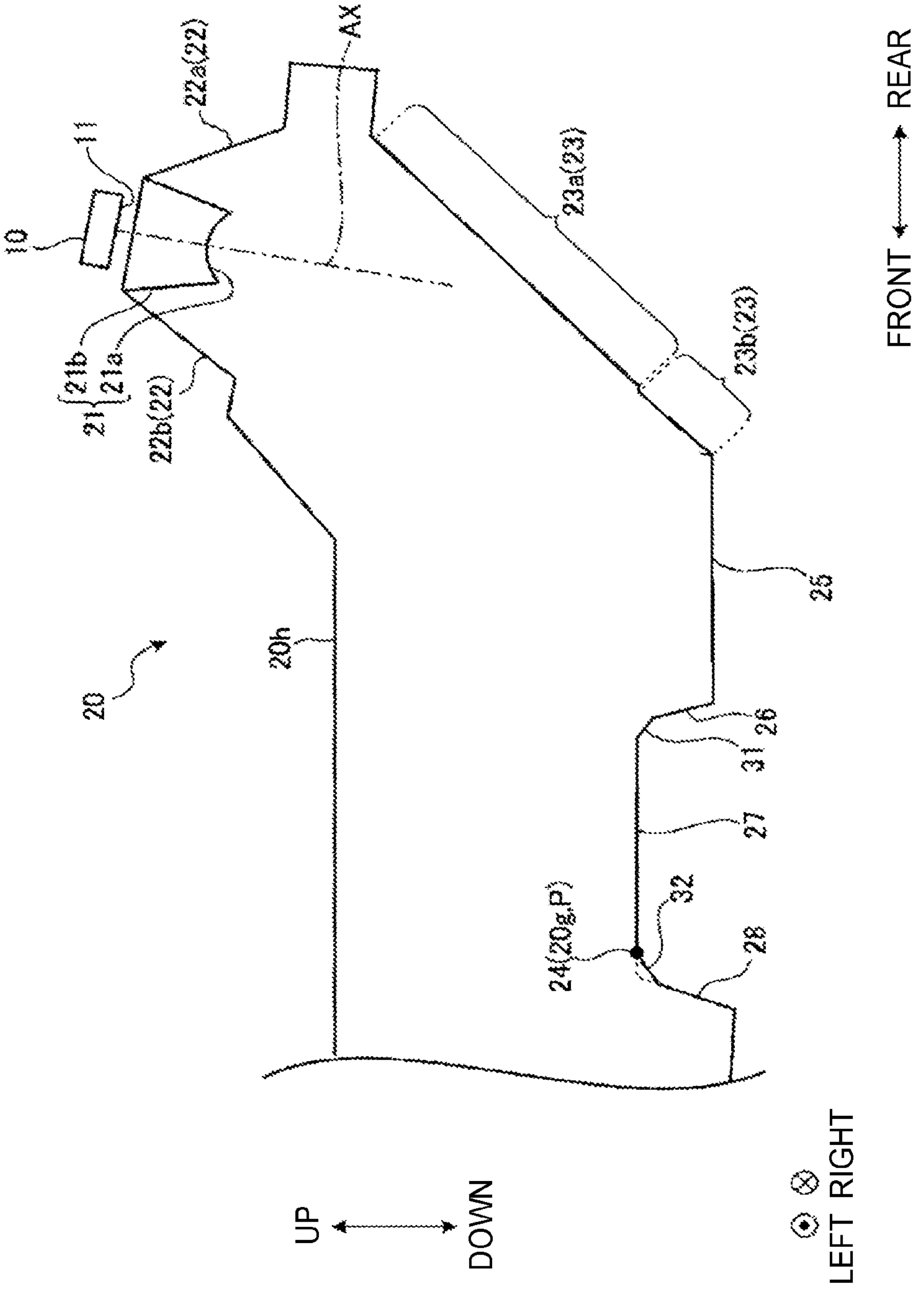
FIG. 3 is an enlarged view of a part of FIG. 2.

FIG. 1 is a plan view showing an example of a vehicle lamp 100 according to the present embodiment. FIG. 2 is a view showing a configuration along an A-A cross section in FIG. 1. FIG. 3 is an enlarged view of a part of FIG. 2.

The vehicle lamp 100 can irradiate a light distribution pattern PF (see FIG. 7) described below, toward the front of the vehicle. In the present embodiment, the light distribution pattern PF includes, for example, a low beam pattern P1 which is a main pattern and an overhead pattern P2 which is an upper pattern. The vehicle lamp 100 includes a light source 10 and a vehicle light-guiding body 20. The vehicle lamp 100 may be configured to further include other units having a light source, a reflector, a shade, a projection lens, and the like. Hereinafter, in the present embodiment, a configuration of the vehicle lamp 100 mounted on a vehicle traveling on a left-hand traffic road will be described as an example.

[Light Source]

In the present embodiment, for example, a semiconductor light source such as an LED or an organic EL (OLED), a laser light source, or the like is used as the light source 10. A light emitting surface 11 is disposed to face an incidence surface 21 of the vehicle light-guiding body 20 described below. The light emitting surface 11 is disposed so as to face the vehicle light-guiding body 20. In the present embodiment, a plurality of light sources 10, for example, four light sources 10 are disposed in the left-right direction. The number of light sources 10 is not limited to four, and may be three or less, or five or more.

[Vehicle Light-Guiding Body]

The vehicle light-guiding body 20 guides the light from the light source 10 and emits the light forward in the vehicle-mounted state. The vehicle light-guiding body 20 according to the present embodiment has a configuration in which respective functions corresponding to, for example, a reflector, a shade, a projection lens, and the like in a conventional projector-type vehicle headlamp are integrated. As shown in FIGS. 1 to 3, the vehicle light-guiding body 20 includes the incidence surface 21, a first reflection surface 22, a second reflection surface 23, a light blocking part 24, an adjustment surface 25, a transmission surface 26, a connection surface 27, a re-incidence surface 28, and an emission surface 29.

[Incidence Surface]

The incidence surface 21 is plural and, for example, is provided for each light source 10. The incidence surface 21 may be provided at a position that does not correspond to the light source 10 in a one-to-one manner. For example, a plurality of incidence surfaces 21 may be provided for one light source 10. The plurality of incidence surfaces 21 are disposed side by side in the left-right direction in the vehicle-mounted state. The incidence surface 21 is formed in, for example, a truncated cone shape. In the present embodiment, for example, four incidence surfaces 21 are disposed. In addition, the diameter of the incidence surface 21 disposed on an outer side in the left-right direction may be smaller than the diameter of the incidence surface 21 disposed on a center side in the left-right direction. In the present embodiment, the diameters of the two incidence surfaces 21 disposed on the outer side in the left-right direction are smaller than the diameters of the two incidence surfaces 21 on the center side in the left-right direction.

As shown in FIG. 2, each incidence surface 21 has a first surface 21*a* and a second surface 21*b*. Light from the light sources 10 is incident on the first surface 21*a* and the second surface 21*b*. The first surface 21*a* faces the light emitting surface 11. The first surface 21*a* is, for example, a convex surface protruding toward the light sources 10, but may be a flat surface. The second surface 21*b* is disposed on the lateral side of the light source 10, and is disposed in a cylindrical surface shape so as to surround the light emitting surface 11 of the light source 10 and the first surface 21*a*.

[First Reflection Surface]

The first reflection surface 22 internally reflects the light incident from the incidence surface 21 and converts the light into substantially parallel light. The first reflection surface 22 is disposed so as to surround the second surface 21*b* of the incidence surface 21, and reflects light incident from the second surface 21*b* toward the second reflection surface 23. In the present embodiment, the first reflection surface 22 is provided corresponding to the incidence surface 21. A plurality of first reflection surfaces 22 are disposed side by side in the left-right direction in the vehicle-mounted state. The plurality of first reflection surfaces 22 include a light condensing pattern reflection surface and a diffusing pattern reflection surface. For example, the two first reflection surfaces 22 disposed on the center side in the left-right direction can be set as light condensing pattern reflection surfaces, and the two first reflection surfaces 22 disposed on both sides in the left-right direction can be set as diffusing pattern reflection surfaces.

The first reflection surface 22 has a first rear region 22*a* and a first front region 22*b*. The first rear region 22*a* is disposed rearward with respect to the light sources 10. In the present embodiment, the first rear region 22*a* is disposed, for example, rearward with respect to the optical axis AX of the light source 10 in the front-rear direction. The first front region 22*b* is disposed forward with respect to the light sources 10. In the present embodiment, the first front region 22*b* is disposed, for example, forward with respect to a virtual plane S.

[Second Reflection Surface]

The second reflection surface 23 has a shape based on a paraboloid of revolution. The second reflection surface 23 has a focus point P which coincides or substantially coincides with a focus point of the paraboloid of revolution. The focus point P is disposed at a position in a vicinity of a focus point of the emission surface 29 described below: The second reflection surface 23 reflects the light from the first reflection surface 22 toward the focus point P, that is, toward the front of the vehicle. The second reflection surface 23 has an axis parallel or substantially parallel to the optical axis of the light reflected by the first reflection surface 22, and internally reflects the light toward the focus point P of the paraboloid of revolution.

The second reflection surface 23 includes a light condensing pattern forming region disposed corresponding to the light condensing pattern reflection surface of the first reflection surface 22, and a diffusion pattern forming region disposed corresponding to the diffusing pattern reflection surface of the first reflection surface 22. The light condensing pattern formation region is disposed at the center of the second reflection surface 23 in the left-right direction. The diffusion pattern formation region is disposed on the outer side in the left-right direction with respect to the light condensing pattern formation region in the second reflection surface 23. The light condensing pattern formation region is disposed, for example, at the center in the left-right direction, and internally reflects the light from the first reflection surface 22 so that the light passes the focus point P and the vicinity of the focus point P. The diffusion pattern formation region internally reflects the light from the first reflection surface 22 so that the light passes through a position shifted to the outer side in the horizontal direction in the vehicle-mounted state with respect to the focus point P including the focus point P. The diffusion pattern forming region is disposed corresponding to the diffusion pattern reflection surface of the plurality of first reflection surfaces 22.

The second reflection surface 23 has a second rear region 23*a* and a second front region 23*b*. The light reflected by the first rear region 22*a* is incident on the second rear region 23*a*. The second rear region 23*a* internally reflects the light reflected by the first rear region 22*a* forward.

The second front region 23*b* is connected to a front side end of the second rear region 23*a*. The light reflected by the first front region 22*b* is incident on the second front region 23*b*. The second front region 23*b* internally reflects the light reflected by the first front region 22*b* forward. The second front region 23*b* is provided, for example, in a state of extending forward from the front side end of the second rear region 23*a*. The second front region 23*b* is smoothly connected to the second rear region 23*a*. Note that the second front region 23*b* may be connected to the second rear region 23*a* in a non-smooth manner. For example, a step may be provided between the second front region 23*b* and the second rear region 23*a*. The second front region 23*b* is disposed downward with respect to the light blocking part 24 described below in the up-down direction.

[Light Blocking Part]

The light blocking part 24 blocks a portion of the light internally reflected by the second rear region 23*a* of the second reflection surface 23. The light blocking part 24 is provided at a front side end (corner portion 20*g*) of the connection surface 27 described below. The corner portion 20*g* has a concave shape when the vehicle light-guiding body 20 is viewed from the outer side (downward). The corner portion 20*g* extends linearly or in a curved state in the left-right direction. In the corner portion 20*g*, the light blocking part 24 forms a cut-off line CL (see FIG. 8) of the low beam pattern P1 of the light distribution pattern PF described below. The cut-off line CL includes a horizontal cut-off line CLa and an oblique cut-off line CLb. The corner portion 20*g* has a horizontal portion (not shown) for forming the horizontal cut-off line CLa and an inclined surface portion (not shown) for forming the oblique cut-off line CLb.

The light blocking part 24 is provided in a region including the corner portion 20*g*. The light blocking part 24 may, for example, block the light by refracting or internally reflecting the light reaching the light blocking part 24 in a direction different from the direction of the emission surface 29, or may block the light by arranging a light absorbing layer in a portion corresponding to the light blocking part 24 in the connection surface 27 including the corner portion 20*g* and absorbing the light by the light absorbing layer. The light internally reflected or refracted by the light blocking part 24 is emitted to the outside of the vehicle light-guiding body 20, and is absorbed by an inner housing or the like disposed at the outside of the vehicle light-guiding body 20.

[Adjustment Surface]

The adjustment surface 25 extends forward from a front side end of the second reflection surface 23, that is, a front side end of the second front region 23*b*. The adjustment surface 25 is provided along a horizontal plane. In this embodiment, the adjustment surface 25 has, for example, a planar shape. The adjustment surface 25 is not limited to a planar shape, and may have a curved shape. The adjustment surface 25 is not limited to the configuration along the horizontal plane, and may have a configuration in which the front side is inclined downward with respect to the horizontal plane. The adjustment surface 25 internally reflects a portion of the light internally reflected by the second reflection surface 23 in a direction in which the light is not emitted from the emission surface 29, for example, in a direction in which an upper surface 20*h* described below is disposed.

[Transmission Surface]

Figure 4:
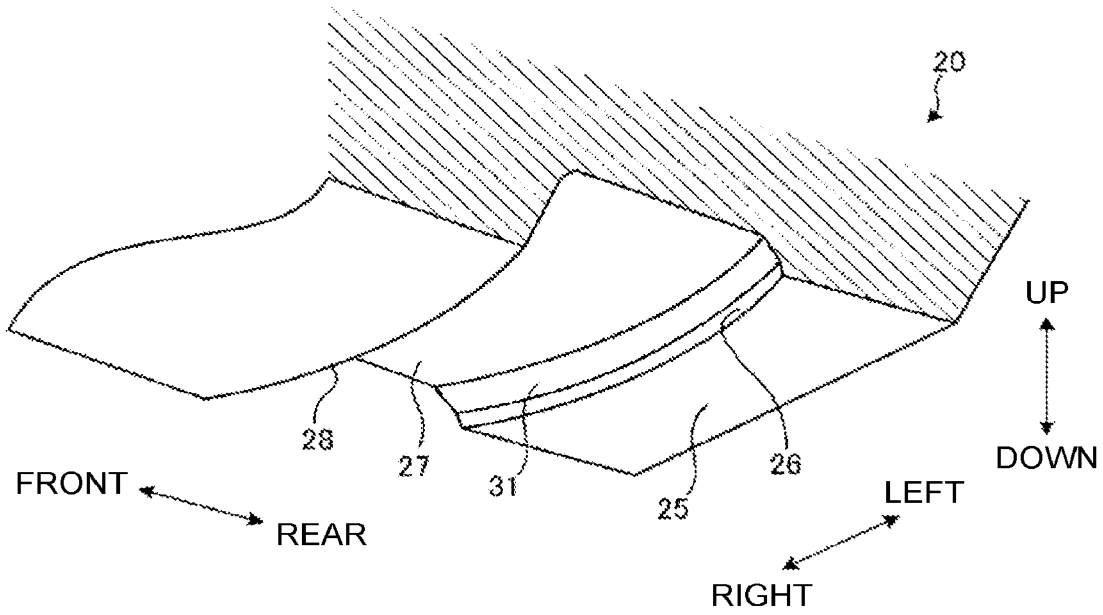
FIG. 4 is a perspective view showing an example of a transmission surface as viewed from an outside of a vehicle light-guiding body.

The transmission surface 26 protrudes upward from a front side end of the adjustment surface 25. FIG. 4 is a perspective view showing an example of the transmission surface 26 as viewed from the outside of the vehicle light-guiding body 20. The transmission surface 26 is provided in a state corresponding to the second front region 23*b*. The transmission surface 26 has, for example, a planar shape and has a shape inclined upward from rear to front. The transmission surface 26 transmits the light reflected by the second front region 23*b* to the light-guiding body outer part and directs the light forward.

Figure 6:
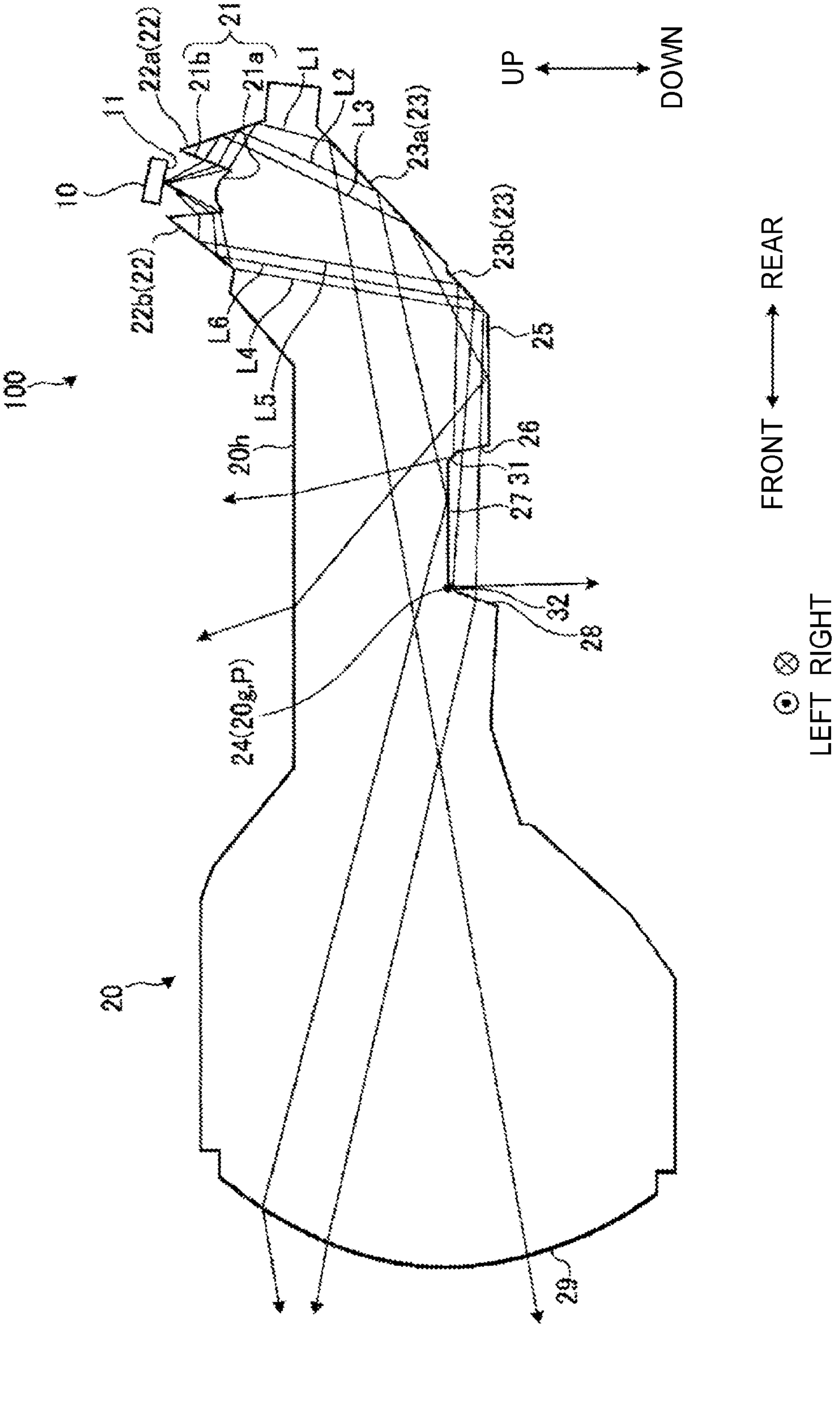
FIG. 6 is a view showing an example of an optical path of light guided by the vehicle light-guiding body.

The transmission surface 26 transmits the light from the second reflection surface 23 to the outside of the vehicle light-guiding body 20, and emits the light forward (see FIG. 6). The light that is transmitted from the transmission surface 26 to the light-guiding body outer part and directed forward is incident on the re-incidence surface 28 described below, and is emitted from the emission surface 29 to form the overhead pattern P2 (see FIG. 8) described below toward the front of the vehicle.

A first glare suppression surface 31 is disposed on the transmission surface 26. The first glare suppression surface 31 internally reflects upward a portion of light reflected by the second front region 23*b*. For example, the first glare suppression surface 31 internally reflects a portion of the light internally reflected by the second front region 23*b* in a direction in which the upper surface 20*h* described later is disposed. The first glare suppression surface 31 internally reflects light corresponding to a region PA (see FIG. 8) near an H-H line upward, thereby preventing the light from being emitted from the emission surface 29. The first glare suppression surface 31 is disposed such that an upper side thereof extends obliquely forward with respect to the transmission surface 26.

The first glare suppression surface 31 is disposed, for example, at an upper portion of the transmission surface 26. As shown in FIG. 4, the first glare suppression surface 31 is formed in a band shape. The arrangement and shape of the first glare suppression surface 31 are not limited to the above configuration.

[Connection Surface]

The connection surface 27 connects an upper side end of the transmission surface 26 and the light blocking part 24. The connection surface 27 is positioned at a lower side of the vehicle light-guiding body 20 and is disposed along a horizontal plane. The connection surface 27 is provided from the light blocking part 24 to a connection portion with the upper side end of the transmission surface 26. Therefore, a region where internal reflection is possible is secured over the front-rear direction on the connection surface 27.

The dimension of the connection surface 27 in the front-rear direction can be set in accordance with the dimension of the adjustment surface 25 in the front-rear direction. That is, when the distance in the front-rear direction from the second reflection surface 23 to the light blocking part 24 is constant, the dimension of the connection surface 27 in the front-rear direction can be made relatively small by making the dimension of the adjustment surface 25 in the front-rear direction relatively large, and the dimension of the connection surface 27 in the front-rear direction can be made relatively large by making the dimension of the adjustment surface 25 in the front-rear direction relatively small. For example, the dimension of the adjustment surface 25 in the front-rear direction can be set in a range from 0.5 times or more to 2 times or less the dimension of the connection surface 27 in the front-rear direction.

[Re-Incidence Surface]

The re-incidence surface 28 is provided in a state of being bent downward with respect to the connection surface 27. The re-incidence surface 28 is formed in a state inclined forward from an upper portion over a lower portion. The light transmitted from the transmission surface 26 to the outside is re-incident on the re-incidence surface 28. The light re-incident from the re-incidence surface 28 travels from a lower side of the light blocking part 24 toward the emission surface 29.

Figure 5:
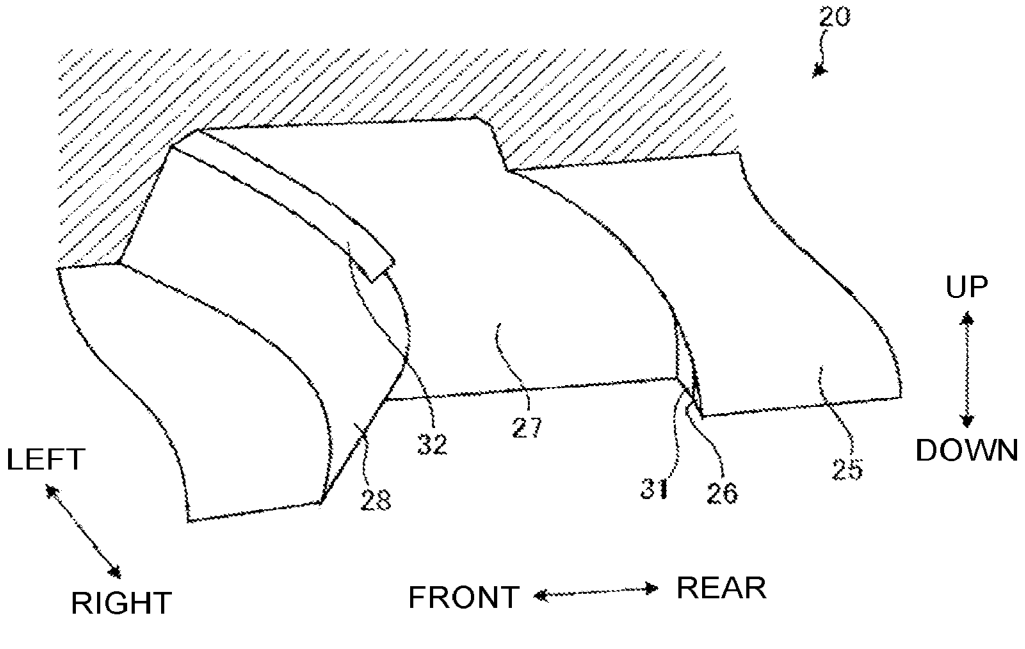
FIG. 5 is a perspective view showing an example of a re-incidence surface as viewed from the outside of the vehicle light-guiding body.

A second glare suppression surface 32 is disposed at an upper portion of the re-incidence surface 28. FIG. 5 is a perspective view showing an example of the re-incidence surface 28 as viewed from the outside of the vehicle light-guiding body 20. The second glare suppression surface 32 reflects downward a portion of the light transmitted from the transmission surface 26 to the outside. The light reflected by the second glare suppression surface 32 is emitted to the outside of the vehicle light-guiding body 20 without reaching the re-incidence surface 28. The second glare suppression surface 32 internally reflects light corresponding to the region PA (see FIG. 8) near the H-H line downward, thereby preventing the light from being emitted from the emission surface 29. The second glare suppression surface 32 is disposed such that an upper side thereof extends obliquely rearward with respect to the transmission surface 26. Further, as shown in FIG. 5, the second glare suppression surface 32 is formed with a constant width in the up-down direction from a left side end to a center portion in the left-right direction. The arrangement and shape of the second glare suppression surface 32 are not limited to the above configuration.

[Emission Surface]

The emission surface 29 emits light which is internally reflected by the second reflection surface 23 and is not blocked by the light blocking part 24, and light which is incident from the re-incidence surface 28, and irradiates the light distribution pattern PF (see FIG. 8) toward the front of the vehicle. In the present embodiment, the emission surface 29 is, for example, in a curved shape, and has a focus point, which is not shown, and an optical axis. In addition, the emission surface 29 may be, for example, in a planar shape, and may have a configuration in which another optical element that irradiates light emitted from the emission surface 29 toward the front of the vehicle is disposed. The focus point of the emission surface 29 is disposed at a position near the focus point P of the second reflection surface 23. Further, in the present embodiment, the width of the emission surface 29 in the left-right direction may be narrower than the width of the second reflection surface 23 in the left-right direction. In this case, the dimensions of the emission surface 29 as viewed from the outside can be suppressed.

A light diffusion portion such as a prism portion may be formed on the upper surface 20*h* of the vehicle light-guiding body 20. The light diffusion portion diffuses the light internally reflected by the second reflection surface 23. Therefore, it is possible to prevent the light emitted from the upper surface 20*h* to the outside of the vehicle light-guiding body 20 from becoming the glare.

[Operation]

Figure 7:
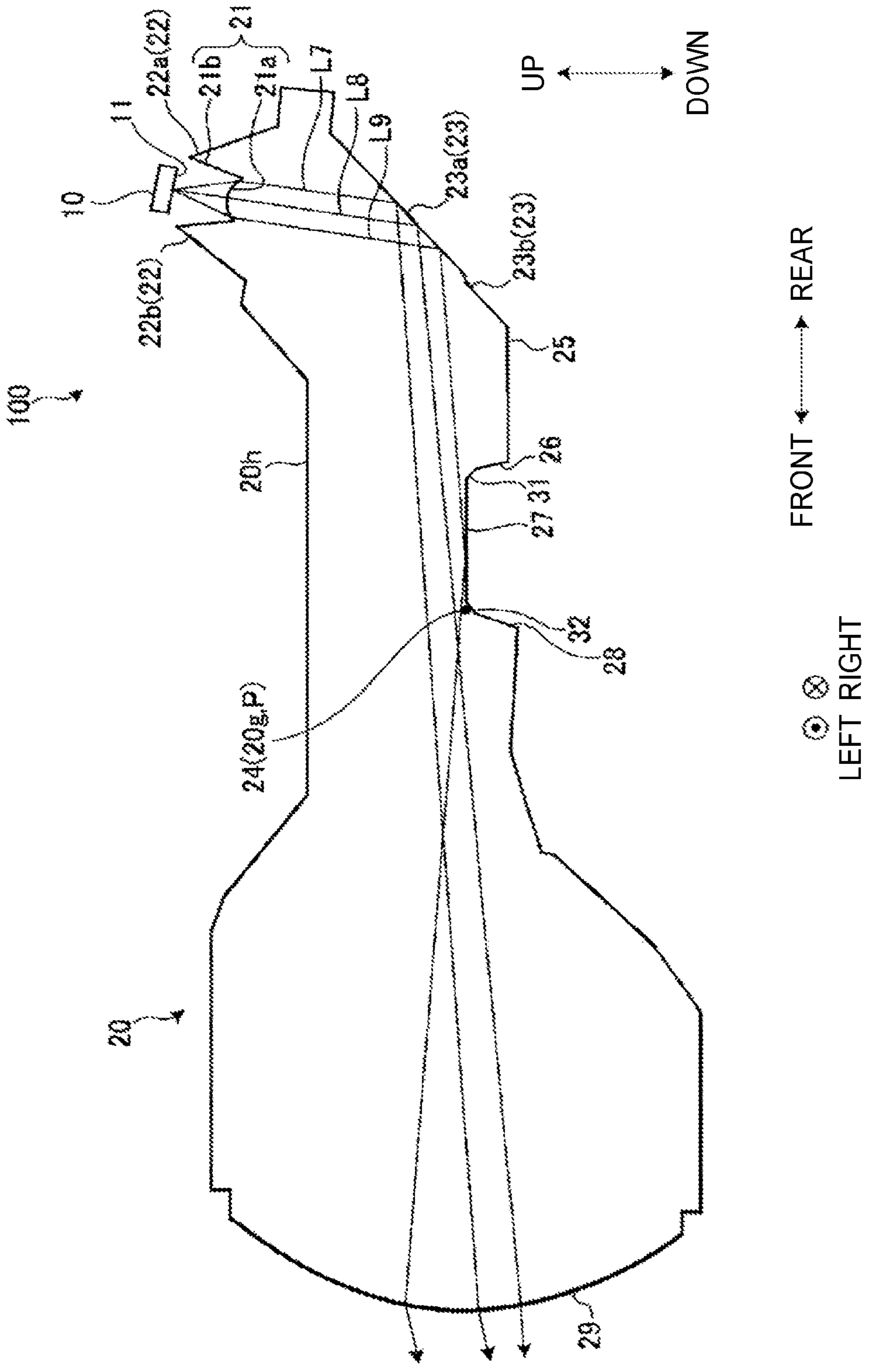
FIG. 7 is a view showing an example of an optical path of light guided by the vehicle light-guiding body.

Next, an operation of the vehicle lamp 100 configured as described above will be described. FIGS. 6 and 7 are views showing examples of optical paths guided by the vehicle light-guiding body 20. Note that the optical paths are separated into FIG. 6 and FIG. 7 just to make the optical paths easier to distinguish. Actually, the light emitted from the light source 10 is not separated into the optical path shown in FIG. 6 and the optical path shown in FIG. 7. When the light source 10 of the vehicle lamp 100 is turned on, light is emitted from the light emitting surface 11. This light is incident from the first surface 21*a* and the second surface 21*b* of the incidence surface 21 into the vehicle light-guiding body 20. The light incident from the first surface 21*a* travels toward the first reflection surface 22. The light incident from the second surface 21*b* is internally reflected by the first reflection surface 22 toward the second reflection surface 23.

As shown in FIG. 6, for example, light L1 that is a portion of the light reflected by the first rear region 22*a* of the first reflection surface 22 and reaching the second rear region 23*a* of the second reflection surface 23 is internally reflected by the second rear region 23*a*, passes above the connection surface 27 and the light blocking part 24, and reaches the emission surface 29. The light L1 that reaches the emission surface 29 is emitted from the emission surface 29 toward the front of the vehicle.

Light L2, which is a portion of the light that reaches the second rear region 23*a*, is internally reflected by the second rear region 23*a* and reaches the connection surface 27. In the present embodiment, the connection surface 27 is formed over the entire area in the front-rear direction from the light blocking part 24 to the transmission surface 26. Therefore, the light L2 that reaches the connection surface 27 is internally reflected toward the front of the vehicle without waste. The light L2 internally reflected by the connection surface 27 passes above the light blocking part 24 and reaches the emission surface 29. The light L2 that reaches the emission surface is emitted from the emission surface 29 toward the front of the vehicle.

Light L3, which is a portion of the light that reaches the second rear region 23*a*, is internally reflected by the second rear region 23*a* and reaches the adjustment surface 25. The light L3 that reaches the adjustment surface 25 is internally reflected by the adjustment surface 25 and emitted from the upper surface 20*h* to the outside of the vehicle light-guiding body 20. The light L3 is not emitted from the emission surface 29. In this way, the shape of the pattern formed by the light L2 emitted from the emission surface 29 is adjusted by causing a portion of the light internally reflected by the second rear region 23*a* to reach the adjustment surface 25.

Light L4, which is a portion of the light that reaches the second front region 23*b* of the second reflection surface 23, is internally reflected by the second front region 23*b*, passes above the adjustment surface 25, and reaches the transmission surface 26. In the present embodiment, the transmission surface 26 is disposed to face the second front region 23*b* in a state of protruding upward from the front side end of the adjustment surface 25. Therefore, the light L4 reflected by the second front region 23*b* is transmitted from the transmission surface 26 to the light-guiding body outer part without waste. The light L4 transmitted to the light-guiding body outer part by the transmission surface 26 travels forward through the light-guiding body outer part, passes below the light blocking part 24, and is re-incident from the re-incidence surface 28 into the inside of the vehicle light-guiding body 20. The re-incident light L4 reaches the emission surface 29 and is emitted from the emission surface 29 toward the front of the vehicle.

In contrast, light L5, which is a portion of the light that reaches the second front region 23*b*, is internally reflected by the second front region 23*b*, passes above the adjustment surface 25, and reaches the first glare suppression surface 31. The light L5 that reaches the first glare suppression surface 31 is internally reflected upward by the first glare suppression surface 31, and is emitted to the outside of the vehicle light-guiding body 20 from the upper surface 20*h*. The light L5 is not emitted from the emission surface 29. Light L6, which is a portion of the light that reaches the second front region 23*b*, is transmitted from the transmission surface 26 to the light-guiding body outer part, and reaches the second glare suppression surface 32. The light L6 that reaches the second glare suppression surface 32 is internally reflected downward by the second glare suppression surface 32. The light L6 is not incident on the re-incidence surface 28 and is not emitted from the emission surface 29.

In addition, as shown in FIG. 7, light L7, which is a portion of the light incident from the first surface 21*a*, is internally reflected by the second rear region 23*a* of the second reflection surface 23, passes above the connection surface 27 and the light blocking part 24, and reaches the emission surface 29. The light L7 that reaches the emission surface 29 is emitted from the emission surface 29 toward the front of the vehicle. In addition, light L8, which is a portion of the light incident from the first surface 21*a*, is internally reflected by the second rear region 23*a* of the second reflection surface 23, passes the light blocking part 24, and reaches the emission surface 29. The light L8 that reaches the emission surface 29 is emitted from the emission surface 29 toward the front of the vehicle.

Light L9, which is a portion of the light incident from the first surface 21*a*, is internally reflected by the second rear region 23*a*, reaches the connection surface 27, and is internally reflected by the connection surface 27 toward the front of the vehicle. The light L9 internally reflected by the connection surface 27 passes above the light blocking part 24 and reaches the emission surface 29. The light L9 that reaches the emission surface is emitted from the emission surface 29 toward the front of the vehicle.

Figure 8:
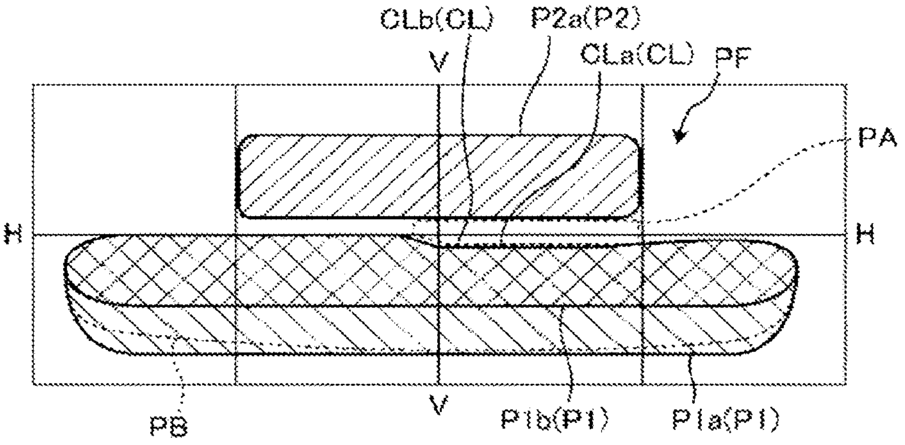
FIG. 8 is a diagram showing an example of a light distribution pattern irradiated on a virtual screen at a front of a vehicle.

FIG. 8 is a diagram showing an example of a light distribution pattern irradiated on a virtual screen at the front of the vehicle. In FIG. 8, a pattern corresponding to a left-hand traffic vehicle is shown. Also, in FIG. 8, a V-V line indicates a vertical line of the screen and the H-H line indicates a left-right horizontal line of the screen. Herein, an intersection of the vertical line and the horizontal line is assumed to be a reference position in the horizontal direction.

As shown in FIG. 8, the light L1, L2, and L4 emitted from the emission surface 29 are irradiated toward the front of the vehicle as the light distribution pattern PF. Specifically, the light L1 and L2 that pass above the light blocking part 24 and reached the emission surface 29 form the low beam pattern P1 including the cut-off line CL. In FIG. 8, an example of a state in which the oblique cut-off line CLb of the cut-off line CL is formed to be inclined downward toward the right side is described, but there is no limitation to this, and the same description can be made in a case in which the oblique cut-off line CLb is formed to be inclined downward toward the left side. In the present embodiment, a pattern P1*a* is formed by the light L1 that is internally reflected by the second rear region 23*a*, passes above the connection surface 27 and the light blocking part 24, and reaches the emission surface 29. In addition, a pattern P1*b* is formed by the light L2 that is internally reflected by the second rear region 23*a* and the connection surface 27, passes above the light blocking part 24, and reaches the emission surface 29. In the present embodiment, the adjustment surface 25 is disposed between the second rear region 23*a* and the connection surface 27. With this arrangement, a portion of light (light L3) reflected by the second rear region 23*a* is emitted to the outside from a portion other than the emission surface 29 of the vehicle light-guiding body 20 via the adjustment surface 25. In this configuration, the area of the connection surface 27 is smaller than that in a comparative configuration in which the adjustment surface 25 is not provided and the transmission surface 26 is disposed at the front side end of the second front region 23*b*. As a result, the irradiation region of the pattern P1*b* by the light L2 is narrower than the irradiation region of a comparison pattern PB in the comparative configuration. In the example shown in FIG. 8, a lower end of the pattern P1*b* is positioned at the upper side of a lower end of the comparison pattern PB. That is, the pattern P1*a* and the pattern P1*b* have cut-off lines CL overlapping each other at upper ends thereof, and the lower end of the pattern P1*b* is closer to the cut-off lines CL than a lower end of the pattern P1*a*. The low beam pattern P1 is a pattern in which the pattern P1*a* and the pattern P1*b* are superimposed. Therefore, by narrowing the irradiation region of the pattern P1*b*, the illuminance of a lower portion of the low beam pattern P1 can be reduced, and the illuminance of the entire pattern can be appropriately adjusted.

In addition, the light L4, which is emitted to the light-guiding body outer part by the transmission surface 26, passes below the light blocking part 24, and reaches the emission surface 29, forms the overhead pattern P2. By using a portion of light reflected by the first front region 22*b* of the first reflection surface 22 as the overhead pattern P2 without waste, it is possible to improve the light use efficiency. Further, in the present embodiment, since the light L5 internally reflected upward by the first glare suppression surface 31 and the light L6 reflected downward by the second glare suppression surface 32 are not emitted from the emission surface 29, a pattern is not formed in a region corresponding to the region PA near the H-H line. Thus, the occurrence of glare is suppressed.

[Vehicle Lighting Unit]

Figure 9:
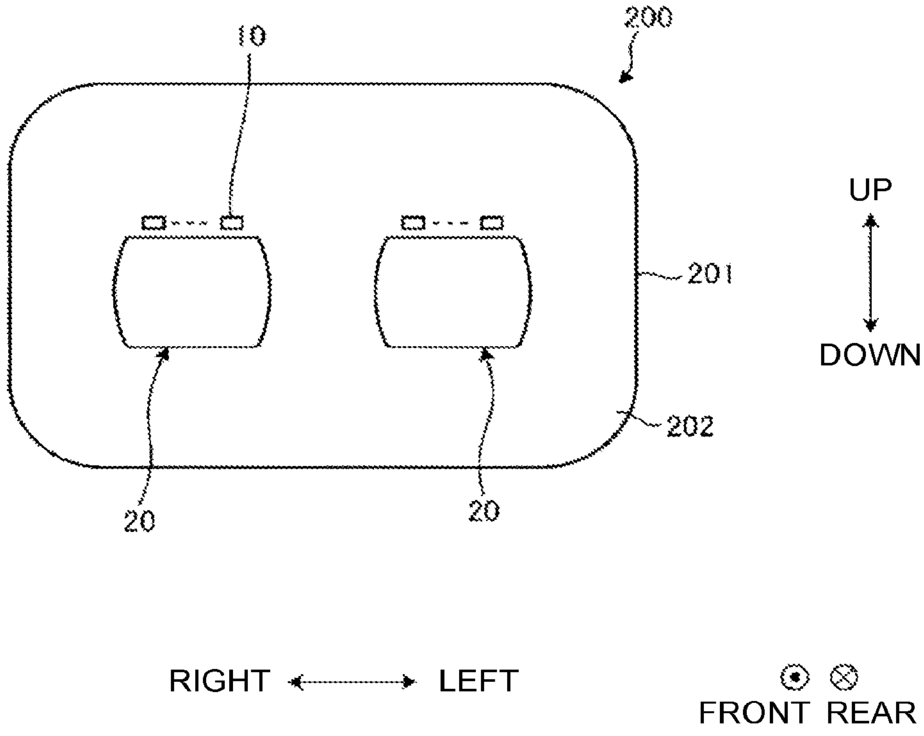
FIG. 9 is a view showing an example of a vehicle lighting unit according to the present embodiment.

FIG. 9 is a view showing an example of the vehicle lighting unit 200 according to the present embodiment. FIG. 9 shows an example as viewed from the front in the vehicle-mounted state. A vehicle lighting unit 200 shown in FIG. 9 includes a housing 201, an outer lens 202, the light sources 10, and a plurality of vehicle light-guiding bodies 20. The vehicle lighting unit 200 has a configuration in which, for example, two vehicle light-guiding bodies 20 are disposed in a lamp chamber surrounded by the housing 201 and the outer lens 202. Note that there may be one or three or more vehicle light-guiding bodies 20 disposed in the lamp chamber. In addition, the vehicle light-guiding bodies 20 are not limited to the arrangement in which the vehicle light-guiding bodies 20 are arranged in the left-right direction when viewed from the front, and may be arranged in the up-down direction, may be arranged in an oblique direction, or may be arranged in a state in which two or more of the left-right direction, the up-down direction, and the oblique direction are combined. Note that the number and arrangement of the light sources 10 may be different for different vehicle light-guiding bodies 20.

For example, one of the vehicle light-guiding bodies 20 may have a light condensing configuration in which the light source 10 is disposed so as to cause light to be incident on the incidence surface 21 on the center side in the left-right direction, and the other vehicle light-guiding body 20 may have a diffusing configuration in which the light source 10 is disposed so as to cause light to be incident on the incidence surface 21 on the outer side in the left-right direction. Further, at least one of the light condensing configuration and the diffusing configuration may be provided in plural. In this case, it is possible to appropriately form the low beam pattern P1 toward the front of the vehicle as the entire vehicle lighting unit 200 while suppressing heat generation from each vehicle light-guiding body 20.

As described above, the vehicle light-guiding body 20 according to the present embodiment includes the incidence surface 21 on which light from the light source 10 is incident: the first reflection surface 22 that internally reflects the light incident from the incidence surface 21 and converts the light into substantially parallel light: the second reflection surface 23 that internally reflects the light reflected by the first reflection surface 22 forward: the light blocking part 24 that blocks a portion of the light reflected by the second reflection surface 23: the adjustment surface 25 that extends forward from the front side end of the second reflection surface 23: the transmission surface 26 that is provided in a state of extending upward in the up-down direction from the front side end of the adjustment surface 25 and transmits a portion of light reflected by the second reflection surface 23 to the light-guiding body outer part forward: the connection surface 27 that connects the upper side end of the transmission surface 26 and the light blocking part 24, and internally reflects a portion of the light internally reflected by the second reflection surface 23 forward: the re-incidence surface 28 that is disposed forward with respect to the transmission surface 26 and downward with respect to the light blocking part 24, and on which the light transmitted from the transmission surface 26 to the guiding body outer part is re-incident: and the emission surface 29 that emits the light internally reflected by the second reflection surface 23, and the light incident from the re-incidence surface 28.

According to this configuration, the main pattern (low beam pattern P1) is formed by the light L1 that is reflected by the second reflection surface 23, passes above the connection surface 27, passes the light blocking part 24 or passes above the light blocking part 24, and is emitted from the emission surface 29, and the light L2 that is internally reflected by the connection surface 27, passes the light blocking part 24 or passes above the light blocking part 24, and is emitted from the emission surface 29. In the present embodiment, since the adjustment surface 25 is disposed between the second reflection surface 23 and the connection surface 27, a portion of light (light L3) reflected by the second reflection surface 23 reaches the adjustment surface 25 without reaching the connection surface 27, and is emitted to the outside from a portion other than the emission surface 29 of the vehicle light-guiding body 20 via the adjustment surface 25. In this configuration, the area of the connection surface 27 is smaller than that of a comparative configuration in which the adjustment surface 25 is not provided and the transmission surface 26 is disposed at the front side end of the second reflection surface 23. As a result, the irradiation region of the pattern P1*b* by the light L2 is narrower than the irradiation region of the comparison pattern PB in the comparative configuration. Therefore, by narrowing the irradiation region of the pattern P1*b* by the light L2, the illuminance of a portion of the low beam pattern P1 can be reduced, and the illuminance of the entire pattern can be appropriately adjusted.

The vehicle light-guiding body 20 described above further includes the first glare suppression surface 31 that is disposed on the transmission surface 26 and internally reflects upward a portion of light (light L5) reflected by the second reflection surface 23. The vehicle light-guiding body 20 described above further includes the second glare suppression surface 32 that is disposed on the re-incidence surface 28 and reflects downward a portion of the light (light L6) transmitted from the transmission surface 26 to the light-guiding body outer part. According to this configuration, light irradiated to a portion of the region of the light distribution pattern PF (overhead pattern P2) is reduced. Consequently, it is possible to suppress, for example, illusion on the side of a vehicle ahead or on the side of an oncoming vehicle, or suppress the generation of glare light. Both the first glare suppression surface 31 and the second glare suppression surface 32 may be provided, or only one of them may be provided.

In the vehicle light-guiding body 20 described above, the emission surface 29 irradiates the light distribution pattern PF toward the front of the vehicle. With this configuration, it is possible to form the light distribution pattern PF toward the front of the vehicle while effectively using light by the vehicle light-guiding body 20 in which the incidence surface 21 to the emission surface 29 are integrated.

In the vehicle light-guiding body 20 described above, the light distribution pattern PF includes the low beam pattern P1 in which the pattern Pla and the pattern P1*b* overlap each other at the front of the vehicle, the pattern Pla is formed by the light L1 that is internally reflected by the second reflection surface 23, passes above the connection surface 27, passes the light blocking part 24 or passes above the light blocking part 24, and is emitted from the emission surface 29, and the pattern P1*b* is formed by the light L2 that is internally reflected by the second reflection surface 23, internally reflected by the connection surface 27, passes the light blocking part 24 or passes above the light blocking part 24, and is emitted from the emission surface 29. According to this configuration, since the low beam pattern P1 is a pattern in which the pattern Pla by the light L1 and the pattern P1*b* by the light L2 are superimposed, it is possible to reduce the illuminance of a portion of the low beam pattern P1*b* by narrowing the irradiation region of the pattern P1 by the light L2, and it is possible to appropriately adjust the illuminance of the entire pattern.

In the vehicle light-guiding body 20 described above, the pattern P1*a* and the pattern P1*b* have cut-off lines CL overlapping each other at upper ends thereof, and the lower end of the pattern P1*b* is closer to the cut-off lines CL than the lower end of the pattern P1*a*. According to this configuration, the illuminance of the lower portion of the low beam pattern P1 can be reduced, and the illuminance of the entire pattern can be appropriately adjusted.

The vehicle lighting unit 200 according to the present invention includes the light source 10, and a plurality of the vehicle light-guiding bodies 20 described above that guide and emit light from the light source 10. According to this configuration, the vehicle lighting unit 200 as a whole can obtain the light distribution pattern PF that combines the irradiation patterns of the plurality of vehicle light-guiding bodies 20.

The technical scope of the present invention is not limited to the above embodiment, and changes may be made as appropriate within a range not departing from the gist of the present invention. In the above-described embodiment, the configuration of the vehicle lamp 100 mounted on a vehicle traveling on a left-hand traffic road has been described as an example. However, the present invention is not limited thereto, and the same description can be applied to a case where the vehicle headlamp is mounted on a vehicle traveling on a right-hand traffic road.

Figure 10:
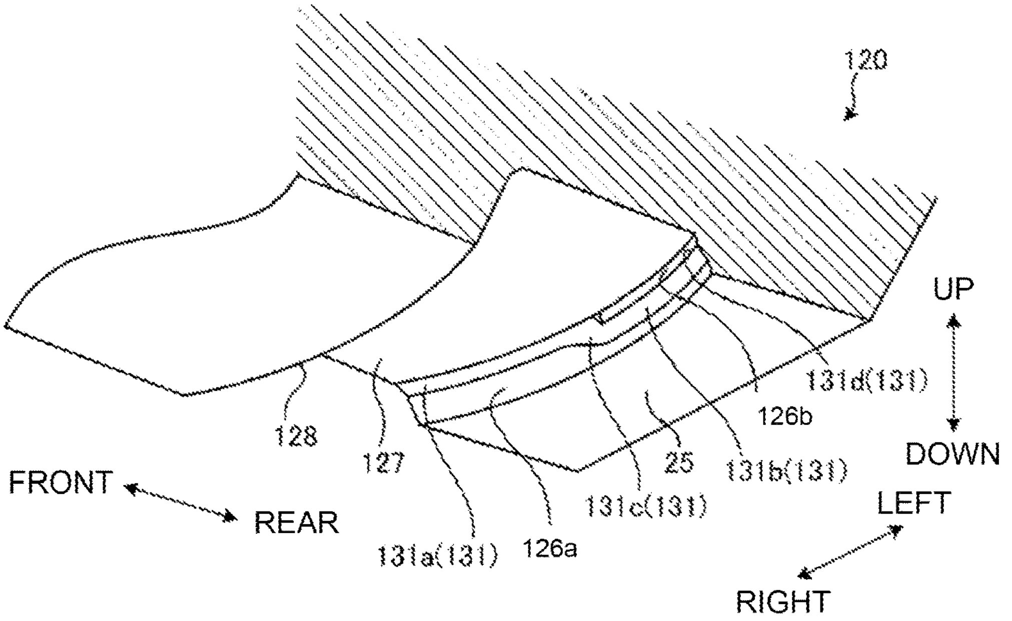
FIG. 10 is a perspective view showing a vehicle light-guiding body according to another example.
Figure 11:
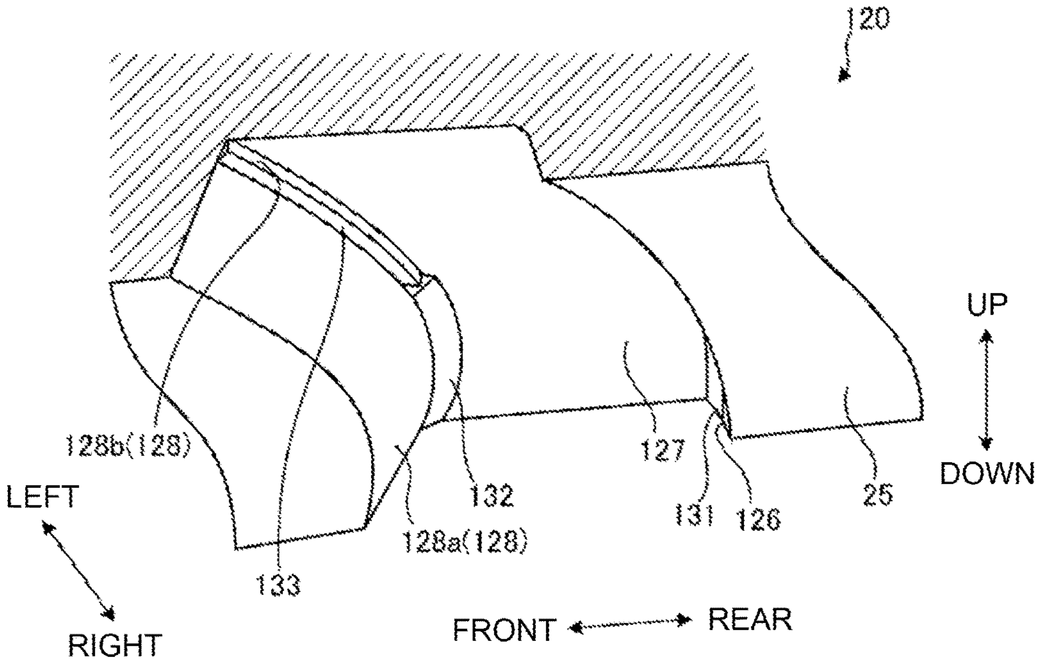
FIG. 11 is a perspective view showing a vehicle light-guiding body according to still another example.

FIGS. 10 and 11 are perspective views showing a vehicle light-guiding body 120 according to other examples. As shown in FIGS. 10 and 11, the vehicle light-guiding body 120 is different from the above-described embodiment in the configurations of a transmission surface 126, a connection surface 127, a re-incidence surface 128, and a first glare suppression surface 131. Other configurations are the same as those of the embodiment described above. Hereinafter, in the vehicle light-guiding body 120, the same configurations as those of the embodiment described above are denoted by the same reference numerals.

As shown in FIG. 10, the first glare suppression surface 131 is disposed on the transmission surface 126. The first glare suppression surface 131 includes belt-like portions 131*a* and 131*b*, a widened portion 131*c*, and a cutout portion 131*d*. The belt-like portion 131*a* is formed to have a constant or substantially constant width in the up-down direction from a right side end of the transmission surface 126 toward a center portion in the left-right direction thereof. The belt-like portion 131*b* is formed to have a constant or substantially constant width in the up-down direction from the left end of the transmission surface 126 toward the center portion in the left-right direction thereof. The widened portion 131*c* is disposed between the belt-like portion 131*a* and the belt-like portion 131*b* at the central portion in the left-right direction of the transmission surface 126, and is widened downward from the central portion in the left-right direction toward the left side. The cutout portion 131*d* is provided, for example, at an upper portion of a left side end of the transmission surface 126. A portion of the transmission surface 126 described above is disposed at the cutout portion 131*d*. That is, the transmission surface 126 is separated by the first glare suppression surface 131 and disposed at a plurality of locations. In the example shown in FIG. 10, the transmission surface 126 is separated in the up-down direction by the first glare suppression surface 131 and is disposed at two locations (transmission surfaces 126*a* and 126*b*). The arrangement and shape of the first glare suppression surface 131 are not limited to the above configuration.

As shown in FIG. 11, re-incidence surface 128 is separated by a step portion 133 and disposed at a plurality of locations. In the example shown in FIG. 11, the re-incidence surface 128 is separated in the up-down direction and the front-rear direction by the step portion 133 and is disposed at two locations (re-incidence surfaces 128*a* and 128*b*). The re-incidence surface 128*b* on the upper side in the up-down direction can be disposed, for example, on the left side of the second glare suppression surface 132. The re-incidence surface 128*b* on the upper side in the up-down direction is disposed rearward with respect to the re-incidence surface 128*a* on the lower side in the up-down direction. The arrangement and shape of the re-incidence surface 128 are not limited to the above configuration.

Figure 12:
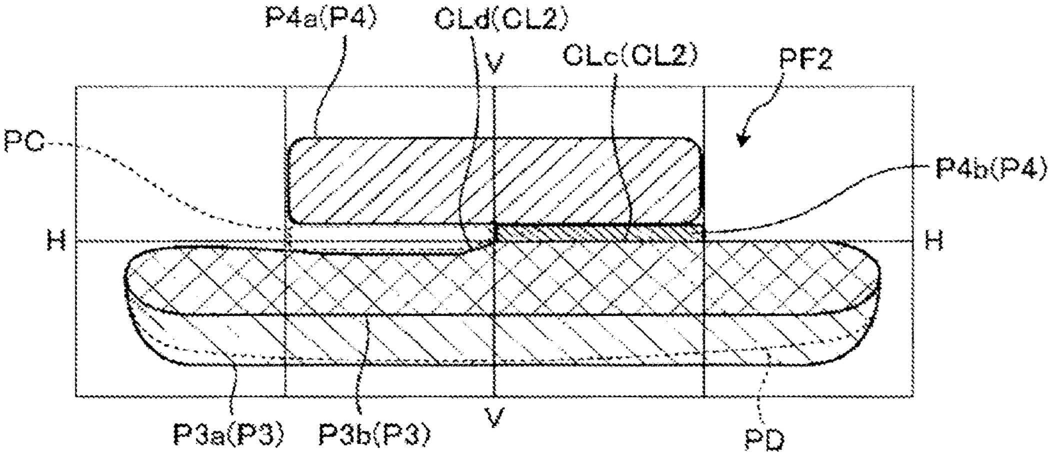
FIG. 12 is a diagram showing an example of a light distribution pattern irradiated on a virtual screen at a front of a right-hand traffic vehicle.

FIG. 12 is a diagram showing an example of a light distribution pattern irradiated on a virtual screen at a front of a right-hand traffic vehicle. In FIG. 12, a V-V line indicates a vertical line of the screen and an H-H line indicates a left-right horizontal line of the screen. Herein, an intersection of the vertical line and the horizontal line is assumed to be a reference position in the horizontal direction.

As shown in FIG. 12, the light emitted from the emission surface 29 of the vehicle light-guiding body 120 is irradiated toward the front of the vehicle as a light distribution pattern PF2. Specifically, a low beam pattern P3 including a cut-off line CL2 is formed by the light which passes above the light blocking part 24 and reaches the emission surface 29. In FIG. 12, a state in which an oblique cut-off line CLd of the cut-off line CL2 is formed to be inclined downward toward the left side will be described as an example. In the vehicle light-guiding body 120, a pattern P3*a* is formed by light that is internally reflected by the second rear region 23*a*, passes above the connection surface 27 and the light blocking part 24, and reaches the emission surface 29. In addition, a pattern P3*b* is formed by light that is internally reflected by the second rear region 23*a* and the connection surface 27, passes above the light blocking part 24, and reaches the emission surface 29. In the example shown in FIG. 12, a lower end of the pattern P3*b* is positioned at the upper side of a lower end of a comparison pattern PD. That is, the pattern P3*a* and the pattern P3*b* have cut-off lines CL2 overlapping each other at upper ends thereof, and the lower end of the pattern P3*b* is closer to the cut-off lines CL2 than a lower end of the pattern P3*a*. The low beam pattern P3 is a pattern in which the pattern P3*a* and the pattern P3*b* are superimposed. Therefore, by narrowing the irradiation region of the pattern P3*b*, the illuminance of a lower portion of the low beam pattern P3 can be reduced, and the illuminance of the entire pattern can be appropriately adjusted.

In addition, light that is emitted to the light-guiding body outer part by the transmission surface 126, passes below the light blocking part 24, and reaches the emission surface 29 forms the overhead pattern P4 (P4*a* and P4*b*). By using a portion of light reflected by the first reflection surface 22 as the overhead pattern P4 without waste, it is possible to improve the light use efficiency. Further, in the vehicle light-guiding body 120, since the light internally reflected upward by the first glare suppression surface 131 and the light reflected downward by the second glare suppression surface 132 are not emitted from the emission surface 29, a pattern is not formed in the region corresponding to a region PC near the H-H line. Thus, the occurrence of glare is suppressed.

Further, in the above-described embodiment, the low beam pattern has been described as an example of the light distribution pattern PF. However, the light distribution pattern PF is not limited thereto, and may be another pattern such as a high beam pattern. Further, in the vehicle lighting unit 200 provided with the plurality of vehicle light-guiding bodies 20, the vehicle light-guiding bodies 20 forming different types of patterns may be provided.

DESCRIPTION OF REFERENCE NUMERALS

AX . . . Optical axis
CL, CL2 . . . Cut-off line
CLa, CLc . . . Horizontal cut-off line
CLb, CLd . . . Oblique cut-off line
L1, L2, L3, L4, L5, L6, L7, L8, L9 . . . Light
P . . . Focus point
P1, P3 . . . Low beam pattern
P1*a*, P1*b*, P3*a*, P3*b* . . . Pattern
P2, P4 (P4*a*, P4*b*) . . . Overhead pattern
PA, PC . . . Region
PB, PD . . . Comparison pattern
PF, PF2 . . . Light distribution pattern
10 . . . Light source
11 . . . Light emitting surface
20 . . . Vehicle light-guiding body
20*g* . . . Corner portion
20*h* . . . Upper surface
21 . . . Incidence surface
21*a* . . . First surface
21*b* . . . Second surface
22 . . . First reflection surface
22*a* . . . First rear region
22*b* . . . First front region
23 . . . Second reflection surface
23*a* . . . Second rear region
23*b* . . . Second front region
24 . . . Light blocking part
25 . . . Adjustment surface
26 . . . Transmission surface
27 . . . Connection surface
28 . . . Re-incidence surface
29 . . . Emission surface
31 . . . First glare suppression surface
32 . . . Second glare suppression surface
100 . . . Vehicle lamp
200 . . . Vehicle lighting unit
201 . . . Housing
202 . . . Outer lens

The invention claimed is:

1. A vehicle light-guiding body comprising:
an incidence surface on which light from a light source is incident;
a first reflection surface that internally reflects the light incident from the incidence surface and converts the light into substantially parallel light;
a second reflection surface that internally reflects the light reflected by the first reflection surface forward;
a light blocking part that blocks a first portion of the light reflected by the second reflection surface, the first portion being light that reaches the light blocking part among the light reflected by the second reflection surface;
an adjustment surface that extends forward from a front side end of the second reflection surface;
a transmission surface that is provided in a state of extending upward in a down-up direction from a front side end of the adjustment surface and transmits a second portion of light reflected by the second reflection surface to a light-guiding body outer part, the second portion being light that reaches the transmission surface among the light reflected by the second reflection surface;
a connection surface that connects an upper side end of the transmission surface and the light blocking part, and internally reflects forward a third portion of the light internally reflected by the second reflection surface-forward, the third portion being light that reaches the connection surface among the light reflected by the second reflection surface;
a re-incidence surface that is disposed forward with respect to the transmission surface and downward with respect to the light blocking part, and on which the light transmitted from the transmission surface to the guiding body outer part is re-incident; and
an emission surface that emits the light internally reflected by the second reflection surface and passing the light blocking part or passing above the light blocking part, and the light incident from the re-incidence surface to form a light distribution pattern in a front of a vehicle,
wherein the light distribution pattern includes a main pattern in which a first pattern and a second pattern overlap each other at the front of the vehicle, the first pattern being formed by the light that is internally reflected by the second reflection surface, passes above the connection surface, passes the light blocking part or passes above the light blocking part, and is emitted from the emission surface, and the second pattern being formed by the light that is internally reflected by the second reflection surface, internally reflected by the connection surface, passes the light blocking part or passes above the light blocking part, and is emitted from the emission surface.

2. The vehicle light-guiding body according to claim 1, further comprising:
a first glare suppression surface that is disposed on the transmission surface and internally reflects upward a fourth portion of light reflected by the second reflection surface, the fourth portion being light that reaches the first glare suppression surface among the light reflected by the second reflection surface.

3. The vehicle light-guiding body according to claim 2, wherein the transmission surface is divided by the first glare suppression surface and disposed at a plurality of locations.

4. The vehicle light-guiding body according to claim 2, further comprising:
a second glare suppression surface that is disposed on the re-incidence surface and reflects downward a portion of the second portion transmitted from the transmission surface to the light-guiding body outer part.

5. The vehicle light-guiding body according to claim 1, wherein the re-incidence surface is divided by a step portion and disposed at a plurality of locations.

6. The vehicle light-guiding body according to claim 1, wherein
the first pattern and the second pattern have cut-off lines overlapping each other at upper ends thereof, and
and a lower end of the second pattern is closer to the cut-off lines than a lower end of the first pattern is.

7. A vehicle lighting unit comprising:

a light source; and a plurality of vehicle light-guiding bodies according to claim 1 that guide and emit light from the light source.

* * * * *